United States Patent
Hill et al.

(10) Patent No.: US 11,567,270 B2
(45) Date of Patent: Jan. 31, 2023

(54) PROTECTIVE CAP FOR AN OPTICAL FIBER CONNECTOR

(71) Applicant: Clearfield, Inc., Minneapolis, MN (US)

(72) Inventors: John P. Hill, Oak Grove, MN (US); Daniel J. Johnson, Blaine, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 17/402,120

(22) Filed: Aug. 13, 2021

(65) Prior Publication Data
US 2021/0382239 A1 Dec. 9, 2021

Related U.S. Application Data

(63) Continuation of application No. 16/751,942, filed on Jan. 24, 2020, now Pat. No. 11,092,754.

(60) Provisional application No. 62/802,782, filed on Feb. 8, 2019.

(51) Int. Cl.
*G02B 6/38* (2006.01)
*G02B 6/44* (2006.01)

(52) U.S. Cl.
CPC ......... *G02B 6/3849* (2013.01); *G02B 6/3825* (2013.01); *G02B 6/4465* (2013.01); *G02B 6/3893* (2013.01); *G02B 6/3897* (2013.01); *G02B 6/4471* (2013.01)

(58) Field of Classification Search
CPC .. G02B 6/3825; G02B 6/3849; G02B 6/3893; G02B 6/3897; G02B 6/4465; G02B 6/4471
See application file for complete search history.

(56) References Cited

U.S. PATENT DOCUMENTS

| | | | | |
|---|---|---|---|---|
| 4,684,161 A * | 8/1987 | Egner | ..................... | F16G 11/14 385/100 |
| 5,067,843 A * | 11/1991 | Nova | ..................... | F16G 11/00 403/301 |
| 8,385,712 B2 * | 2/2013 | Ahmed | ............... | G02B 6/4465 385/136 |
| 10,073,224 B2 * | 9/2018 | Tong | ..................... | G02B 6/3869 |
| 11,092,754 B2 * | 8/2021 | Hill | ..................... | G02B 6/3825 |
| 2012/0141075 A1 * | 6/2012 | Griffiths | ................ | H02G 1/081 385/77 |
| 2014/0133808 A1 * | 5/2014 | Hill | ..................... | G02B 6/3878 385/84 |

* cited by examiner

*Primary Examiner* — Daniel Petkovsek
(74) *Attorney, Agent, or Firm* — Troutman Pepper Hamilton Sanders LLP

(57) ABSTRACT

A pre-terminated end of a fiber optic cable has a protective cap that protects the optical fiber and the ferrule assembly at the terminal end. The protective cap has an attachment feature enabling a pull cord to attach to the protective cap. The protective cap has a body including an exterior surface and a receptacle formed in the body and configured to receive a portion of the fiber optic cable, and the attachment feature. The attachment feature includes a cavity formed in a tip of the body and at least two openings formed in the exterior surface of the body and connected to the cavity.

4 Claims, 6 Drawing Sheets

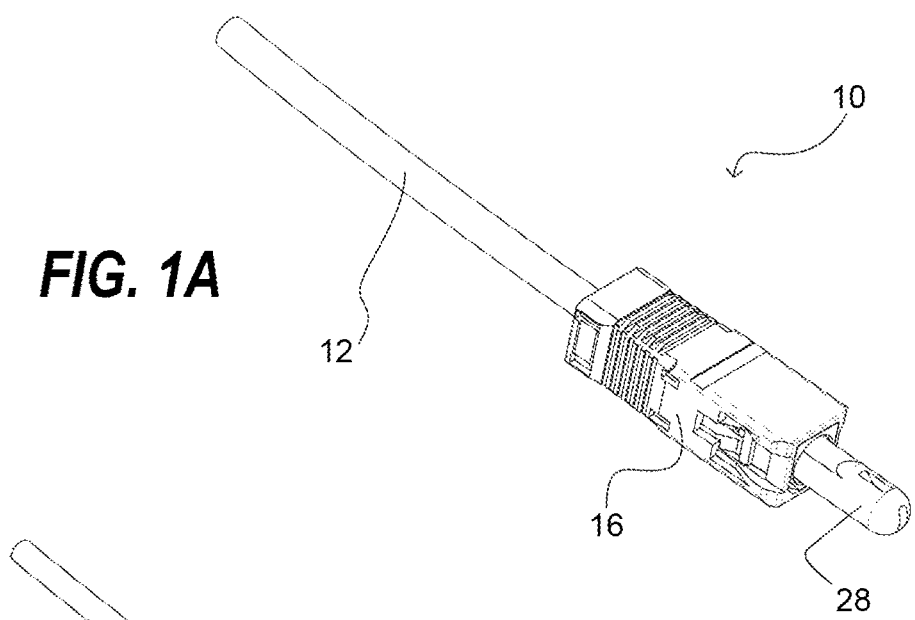
FIG. 1A
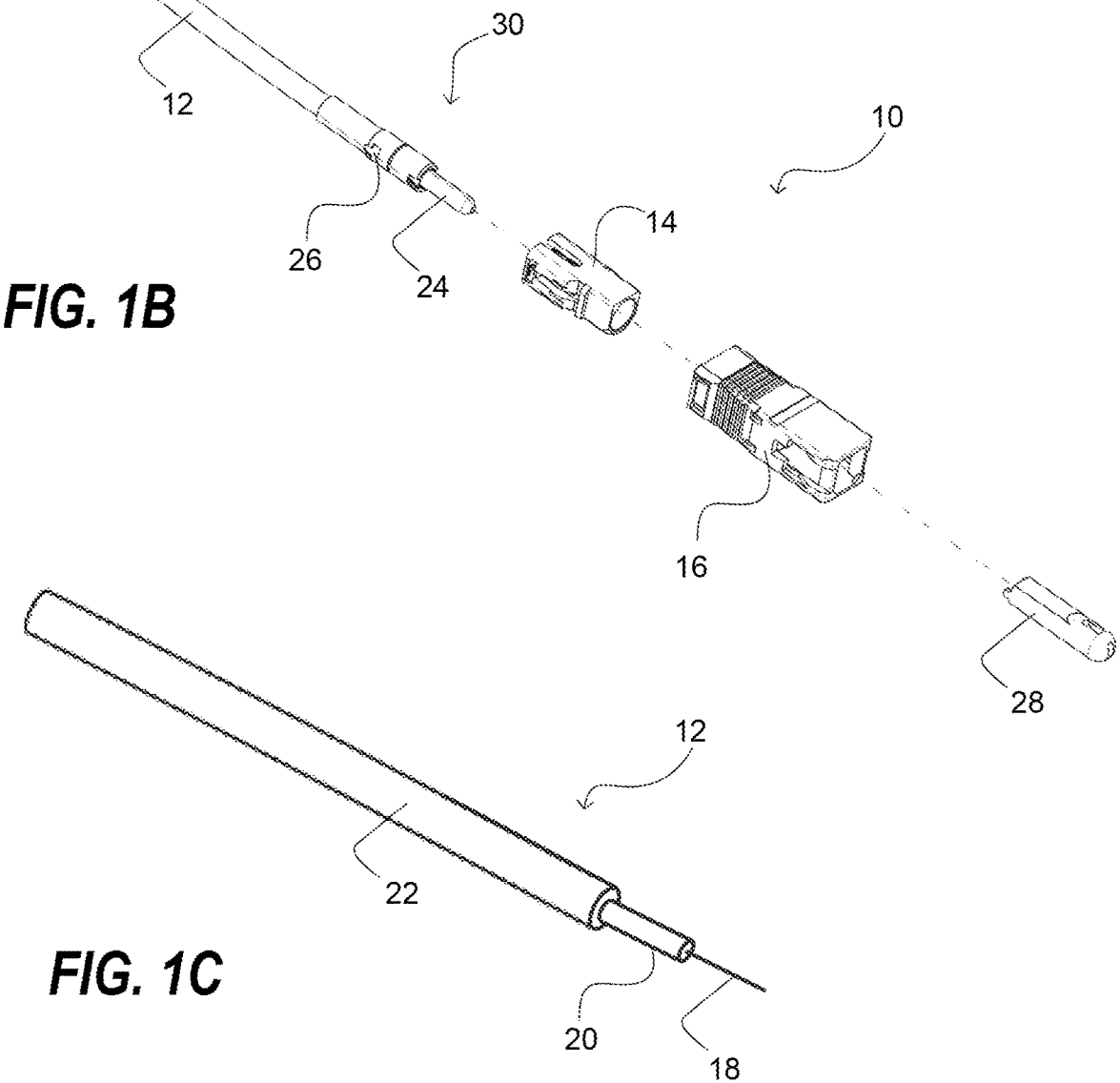
FIG. 1B
FIG. 1C

PROTECTIVE CAP FOR AN OPTICAL FIBER CONNECTOR

CROSS-REFERENCE TO RELATED APPLICATIONS

This application is a continuation of U.S. patent application Ser. No. 16/751,942 filed Jan. 24, 2020, patented as U.S. Pat. No. 11,092,754 issued Aug. 17, 2021, and claims the benefit of priority of U.S. Provisional Patent Application No. 62/802,782, filed on Feb. 8, 2019, the entire contents of both of which are hereby incorporated by reference herein.

TECHNICAL FIELD

The present disclosure relates generally to a protective cap for an optical fiber connector, and more specifically to a protective cap having a built-in attachment for a pull cord for pulling the optical fiber connector through a conduit.

BACKGROUND

The use of fiber optics for communications purposes continues to grow. Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adaptor to align the fibers such that the light can transmit without interruption.

Optical fiber is therefore often provided in a range of different lengths, pre-terminated at both ends with a connector plug ready to plug into a matching receptacle. In many installations, optical fiber cables are routed through a protective conduit, that not only protects the cable, but also allows for rapid restoration methods when the conduit, fiber optic cable, or both are cut or damaged and replacement is necessary. Since pre-installed connectors are of an industry standard footprint, the full-assembled connectors may be too large to be pushed or pulled through microduct because of size constraints, as some microducts may have internal diameters of only about 6 mm, essentially large enough for the cables to fit through, but not a fully assembled connector.

It has therefore become desirable to provide partially assembled connectors, pre-assembled with requisite tolerances, that may be able to be pushed or pulled through a conduit. Any additional final assembly of the connector components may then be performed on site once the objective of delivering the fiber through a length of microduct has been achieved. There remains a need for pre-assembled cables and cable connectors that have a smaller footprint, allowing for the pre-assembled cables to be inserted through minimal diameter conduit to thereby minimize the intrusion of placing the pathway or conduit for the fiber optic network, while also minimizing on-site assembly time and costs.

Recently, pre-terminated fiber optic cables have been developed with small footprints to enable pushing or pulling through the conduit. However, there remains a need to enhance the ability to facilitate the pushing or pulling of the cable without causing damage to the connector or the conduit. The present disclosure is directed to addressing this need and other issues of the prior art.

SUMMARY

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

In an embodiment, a protective cap for a fiber optic cable includes a body of the protective cap including an exterior surface, a receptacle formed in the body and configured to receive a portion of the fiber optic cable, a cavity formed in a tip of the body, and at least two openings formed in the exterior surface of the body and connected to the cavity.

In another embodiment, a terminal end assembly for an optical fiber cable includes a ferrule for receiving and terminating an optical fiber of an optical fiber cable, a ferrule holder having a first end for receiving the optical fiber therethrough, and a second end opposite the first end for receiving and retaining the ferrule therein, a connector body having a first end configured for receiving and retaining a terminal end of a fiber optic cable therein, and a second end configured for slidably receiving the ferrule holder therein, a biasing member disposed within the connector body for biasing the ferrule holder axially away from the connector body, and a ferrule retainer for retaining the ferrule holder within the second end of the connector body, the retainer comprising a tubular body for being disposed around the ferrule and ferrule holder. The terminal end assembly further includes a protective cap for being disposed around the ferrule and in engagement with the ferrule retainer. The protective cap includes a receptacle for receiving the ferrule therein and a leading tip opposite the first end and an attachment feature. The attachment feature includes a cavity formed in the leading tip and at least two openings formed in an exterior surface of the protective cap and connected to the cavity such that a pull cord may enter one of the openings and exit another of the openings to attach to the protective cap.

Additional features and advantages of the invention will be made apparent from the following detailed description of illustrative embodiments that proceeds with reference to the accompanying drawings

BRIEF DESCRIPTION OF THE FIGURES

FIG. 1A depicts a fiber optic cable and connector assembly according to an embodiment;

FIG. 1B depicts an exploded view of the fiber optic cable and connector assembly of FIG. 1A;

FIG. 1C further illustrates an optical fiber that may be used in conjunction with the fiber optic cable and connector assembly of FIG. 1A;

DETAILED DESCRIPTION

Figure 2A:
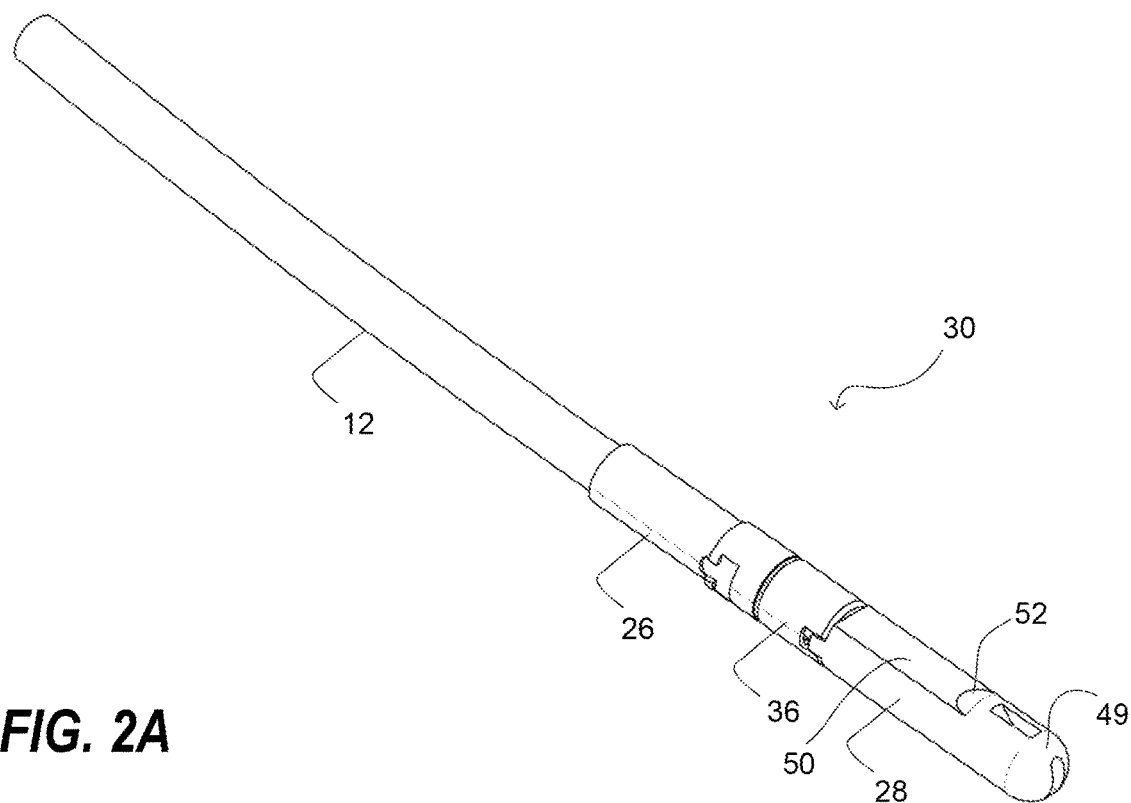
FIG. 2A depicts a pre-terminated fiber optic cable according to an embodiment

The present disclosure describes a protective cap for a fiber optic cable. The protective cap includes an attachment feature for attachment to a pull cord. The attachment feature may include an hollowed cavity in a tip of the protective cap having at least two distinct openings such that the pull cord may be inserted into one of the openings and exit a separate opening in order to be secured to the protective cap. The attachment feature is built-in to the cap to avoid adding any additional material or components to the fiber optic cable that may add size to the cable and hinder its ability to be pushed or pulled through a conduit. The attachment feature may enable the attachment of a pull cord while maintaining a small footprint for the protective cap and convenient shape for traversing the interior of a conduit or other small space.

FIGS. 1A and 1B depict perspective views of a fiber optic assembly 10 in an assembled view (FIG. 1A) and an exploded component view (FIG. 1B). While the depicted fiber optic assembly 10 is of an SC type connector, any description and drawings presented herein are also applicable to other types of fiber optic connectors, such as, for example, MPO, MT-RJ, APC (Angled Polished Connector), SC APC, FC, FC APC, ST, LC, LC APC, dual or simplex, with multi-mode or single-mode fibers.

In an embodiment as depicted in FIGS. 1A and 1B, the fiber optic assembly 10 may include an optical fiber cable 12, a ferrule-housing 14, and an outer housing 16 to provide a push/pull engagement and disengagement with a mating optical fiber socket (not shown). As represented in FIG. 1C, the cable 12 may include an optical fiber 18, with a protective layer 20, and an outer sheath 22. In an embodiment of a single strand SC connector, the optical fiber 18 may have a diameter of about 125 µm, the protective layer 20 may have a diameter of about 900 µm, and the outer sheath 22 may have a diameter of about 3 mm to about 5 mm.

The optical fiber 18 may terminate in a ferrule 24 retained with the cable 12 by means of a connector body 26. The connector body 26 provides a back post for the connector assembly. In an embodiment, the ferrule 24 may be a cylindrical ceramic ferrule. A protective cap 28 may be provided to protect the ferrule 24 and terminal end of the optical fiber 18 prior to a final installation or connection with a mating wire or device (not shown). The combination of at least the cable 12, ferrule 24, and connector body 26 may form a pre-terminated cable end 30.

The ferrule housing 14 may be placed onto the pre-terminated cable end 30. The external surface of the connector body 26 may include T-shaped alignment and engagement depressions 54 that provide an engagement surface to engage with internal configurations of the ferrule housing 14.

The outer housing 16 may be installed by sliding the housing 16 over the installed ferrule housing 14. In an embodiment, the outer housing 16 may fit over the ferrule housing 14 in any orientation. In another embodiment, the outer housing 16 and ferrule housing 14 may include alignment features that only allows the outer housing 16 to be inserted onto the ferrule housing 14 in only one orientation.

The outer housing 16 and ferrule housing 14 may be configured to interlock with one another to retain the parts together once assembled.

As discussed previously, because of the required mechanical tolerances in the terminal end of a cable 12, costs may be reduced with an increase in quality by providing pre-terminated lengths of cable, pre-terminated at both ends with a connector plug ready to plug into a matching receptacle. In an embodiment, wherein there were no size restrictions (for example, in the cross-sectional dimensions of the housing 16), a pre-terminated cable may be represented by the configuration as depicted in FIG. 1A, with the outer housing 16 attached to the cable 12 and the cable ends ready for connection to a coupling arrangement.

However, as mentioned previously, it is often desirable to feed the cable 12 through small diameter conduit, for example less than about 10 mm ID, to guide the cable to a destination, and provide protection for an installed cable. The conduit may be bend-limiting to limit the radius of curvature through which the conduit may be bent. Therefore, it is desirable to provide pre-terminated cables that have minimal cross-sectional dimension, or diameter, that allows the cable to be inserted through a bent conduit. A pre-terminated cable may therefore be represented by the configuration as depicted in FIG. 2A, wherein the cable 12 is fitted with at least the ferrule 24 that provides the terminal end of the optical fiber 18. In addition, to protect the ferrule 24 and terminal end of the optical fiber 18, it may also be desirable to provide the pre-terminated cable ends with the protective cap 28.

Figure 2B:
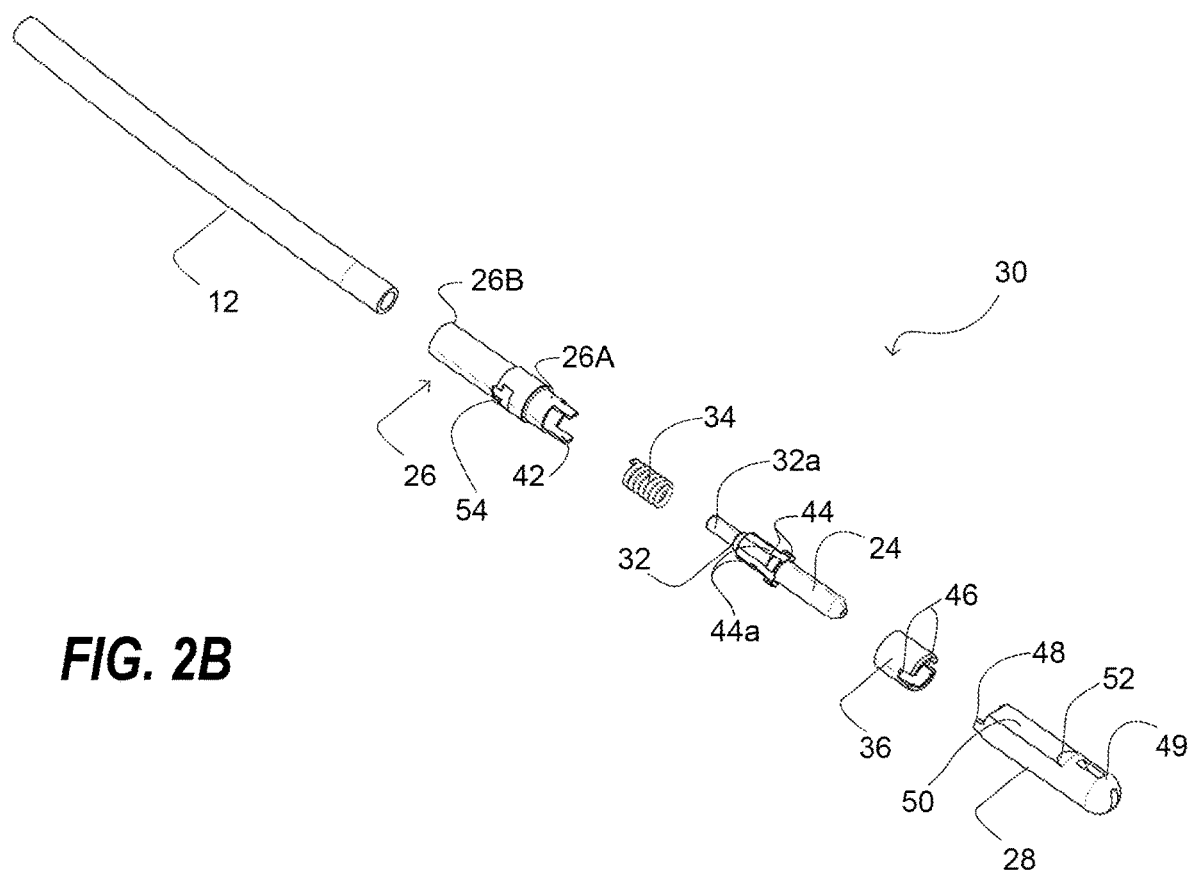
FIG. 2B depicts an exploded view of the pre-terminated fiber optic cable of FIG. 2A.

An embodiment of a pre-terminated cable end 30 with a protective cap 28 installed is represented in FIG. 2A, while FIG. 2B provides an exploded view of the parts. The ferrule 24 may be fitted into a ferrule holder 32. In FIG. 2B, the cable 12 is truncated for clarity, but the end of the cable would be similar to the depiction of FIG. 1C, with the optical fiber 18 extending through the body of the ferrule 24 to the terminal end of the ferrule 24, and the protective layer 20 terminating at approximately the other end of the ferrule 24 within the ferrule holder 32. A biasing member 34, such as a spring may be included to provide a biasing force for pressing the ferrule 24 into engagement with an end of another fiber optic device, such as another ferrule. In an embodiment, post 32a of the holder 32 may be crimped about the protective layer 20 to better retain the fiber in the ferrule 24.

A ferrule retainer 36 may be included to retain the ferrule holder 32 and biasing member 34 within the connector body 26. The retainer 36 may fit over the end 26A of the connector body 26 and may itself be retained on the end 26A by a friction fit. Because of the biasing force of the biasing member 34 pressing the ferrule holder 32 outwardly from the connector body 26, the friction fit will need to be sufficiently tight to hold the retainer 36 on the end 26A. This may be achieved by making the internal diameter of the retainer 36 slightly less than the external diameter of the end 26A. Alternatively, a variety of other types of retention configurations, or combinations of retention configurations may be provided. For example, a permanent connection may be provided with adhesive between the end 26A and the retainer 36, or, while not shown, one of the end 26A or retainer 36 may include a circumferential groove, and the other of the end or retainer may include a circumferential projection which fits into the groove to provide an additional interlocking force to hold the retainer in place.

In an embodiment, a method for assembling a pre-terminated cable end 30 may include removing appropriate lengths of the cable outer sheath 22 and cable protective layer 20 to provide an exposed optical fiber 18 as represented in FIG. 1C. The connector body 26 may then be inserted onto the cable 12 until the end of the cable outer sheath 22 abuts the projections 38 within the connector body. The ferrule 24 may be inserted into a ferrule holder 32, and together with the biasing member 34 the ferrule assembly may be positioned onto the end of the optical fiber 18 and cable protective layer 20. The ferrule retainer may be installed to retain the ferrule assembly within the connector body 26. The connector body 26 may be crimped onto the cable 12 to fasten the connector body in place. The ferrule tip may be finished (polished), and the protective cap 28 installed.

In an embodiment, the protective cap 28, the ferrule retainer 36 and at least a portion of the connector body 26 may be configured to completely surround and enclose the ferrule 24, ferrule holder 32, and biasing member 34, to thereby provide protection for the ferrule, ferrule holder, and spring. By completely surrounding and enclosing the ferrule 24, ferrule holder 32, and biasing member 34, any foreign contaminants, such as particles, may be prevented from entering the internal cavity and interfering with movement of the ferrule holder 32. The protective cap 28, the ferrule retainer 36 and at least a portion of the connector body 26 may provide a protective, rigid encasement, or capsule, with a cavity formed therein for receipt of the ferrule 24, ferrule holder 32, and biasing member 34.

Figure 2C:
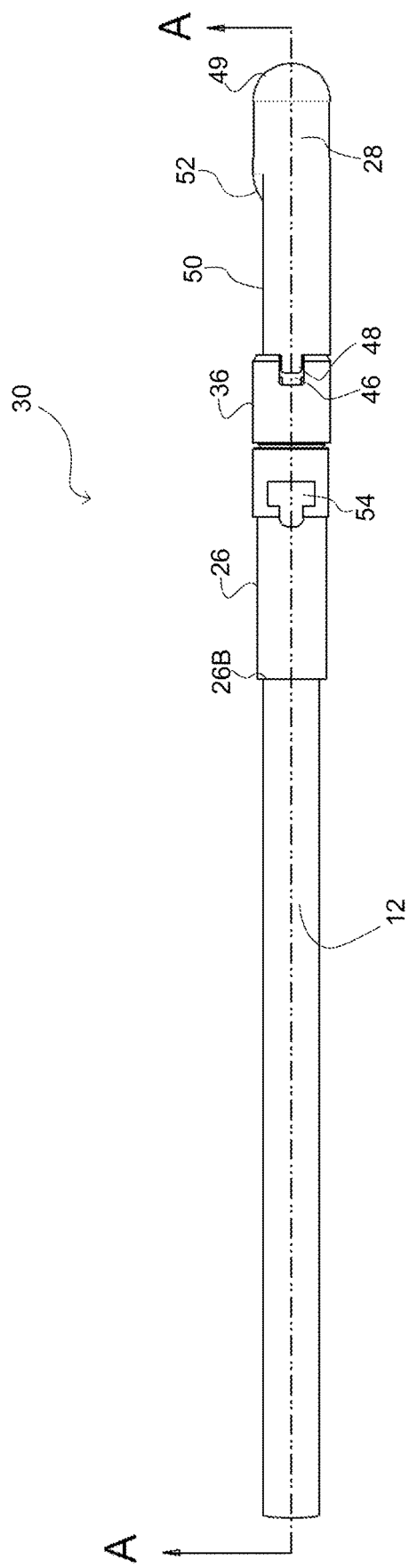
FIG. 2C depicts a side view of the pre-terminated fiber optic cable of FIG. 2A.
Figure 2D:
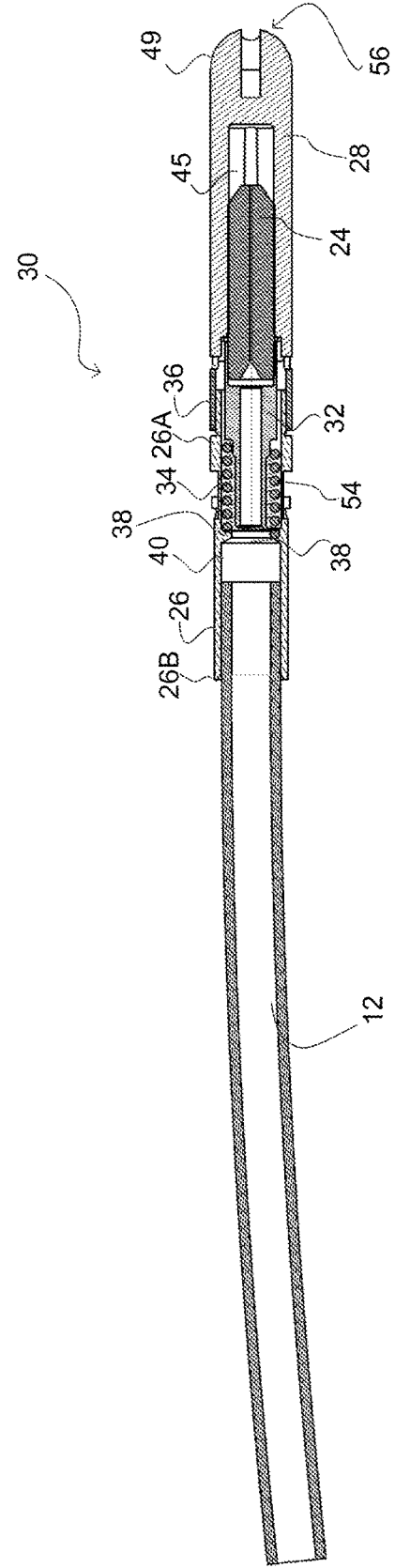
FIG. 2D depicts a cross-sectional view of the pre-terminated fiber optic cable, taken along line A-A of FIG. 2C.

FIGS. 2C and 2D provide a side view and cross-sectional view of the pre-terminated cable end 30. FIG. 2C includes cable 12 and protective cap 28. As shown in FIG. 2D, within the connector body 26 there may be a plurality of projections 38 that project into the internal cavity 40, (for example a minimum of three spaced at about 120° or four space at about 90°) or alternatively an inwardly projecting ring that extends the full 360° around the inside of the internal cavity 40. The projection 38 may serve two purposes, providing a stop for the insertion of the cable, wherein the cable outer sheath 22 may abut the projection 38 on the one side, and the other side of the projection 38 may provide a shoulder for the biasing member 34. In the depicted embodiment, biasing member 34 may therefore be disposed within the cavity 40, with one end of the biasing member 34 abutting the projection 38, and the other end of the biasing member 34 abutting the ferrule holder 32, so that upon assembly, the biasing member 34 becomes compressed between the shoulder projection 38 and the ferrule holder 32 to apply a bias to the ferrule holder 32 when assembled. As described above, the ferrule retainer 36, may then hold the biasing member 34 and ferrule holder 32 in the connector body 26.

Upon insertion of a cable 12 into the internal cavity 40, end 26B of the connector body 26 may be crimped onto the cable 12. Instead of crimping, other types of engagement configurations may be used. For a more permanent connection, an adhesive may be used to retain the cable 12 within the connector body 26. Alternatively, a plurality of teeth may be provided on the internal surface within the cavity 40, wherein the teeth may have a longitudinally extending surface that reduces the internal diameter of the cavity in the insertion direction, thereby allowing the cable to be forcibly inserted into the cavity, whereby a trailing edge of the teeth will then engage into the outer surface of the cable outer sheath 22 and hold the cable in place within the cavity 40.

In an embodiment, it may be desirable for the pre-terminated cable end 30 to include alignment and anti-rotation features. As shown in FIG. 2B, end 26A of the connector body 26 may include at least one arm extension 42 that fits between a pair of guide arms 44 of the ferrule holder 32. The guide arms 44 may define a channel 44a therebetween into which the arm extension 42 may be slidingly disposed. Interaction of the arm extensions 42 and guide arms 44 may allow for longitudinal sliding movement of the ferrule holder 32 within the internal cavity 40 while preventing any rotational movement. This type of guided movement may be used, for example, for ferrules that may have an angled tip (not shown), so that the tip surfaces of two tip-to-tip aligned ferrules may remain properly aligned and in full surface to surface contact.

While at least one arm extension 42 and pair of guide arms 44 may be sufficient to inhibit rotation, additional ones of the arms may be provided as shown in FIG. 2B, wherein two oppositely disposed arm extensions 42 extend from the end 26A (at about 180° from one another), and the ferrule holder 32 includes four guide arms 44 disposed at about 90°, with guide channels 44a disposed between each pair of adjacent guide arms 44. In the depicted embodiment, the ferrule holder 32 may be disposed at any of four rotational positions with respect to the end 26A. Other type of anti-rotational configurations, or combinations of anti-rotational configurations may also be provided. For example, the interior surface of the end 26 A may include alignment grooves, and the external surface of the ferrule holder 32 may include projections corresponding to the grooves.

The protective cap 28 may include a receptacle 45 configured to receive the ferrule 24. The ferrule retainer 36 may include alignment notches 46 that are configured to receive corresponding projections 48 of the protective cap 28 to prevent the protective cap from spinning on the ferrule 24. In an embodiment, the protective cap 28 may also be configured without such projections 48, thereby allowing for the cap to spin about the ferrule 24. The alignment notches 46 may also align with channels 44a, and in an embodiment, the notches 46 may be aligned with channels 44a that do not have the arm extensions 42 disposed therein. The projections 48 may have a thickness dimension that allows the projections to not only align with the notches 46, but also thereby align with and extend into the channels 44a. The protective cap 28 may fit sufficiently snugly around the ferrule 24 so that the cap may be retained on the ferrule by friction. Any of a variety of other types of alignment and retention configurations, or combinations thereof, such as those already discussed previously may also be used. As an additional example, the circumferential edges of the projections 48 (in FIG. 2C—the edges facing up and down) may fit tightly within the circumferential edges of the notches 46 to frictionally retain the protective cap 28 with the retainer 36, or the same edges may have projections/corresponding recesses that may snap together to hold the cap in place.

FIGS. 3A-3G further illustrate the protective cap 28, according to an embodiment. As shown, a leading tip 49 of the protective cap 28 is formed on a side opposite the receptacle 45. The leading tip 49 may be shaped to facilitate movement of the cable 12 with pre-terminated end 30 through a conduit (not shown). As an example, tip 49 may have a rounded, ballistic configuration. In an embodiment, the protective cap 28 may be formed of a low friction material, such as PTFE, to facilitate movement of the protective cap 28 along the inside of a conduit. The rounded leading tip 49 may allow for easier passage through a tight radius during installation, such as when the cable 12 is being pushed or pulled through a duct/conduit that is bent and includes a tight radius. A component such as a drill may be used, in a number of embodiments, to push assembly 10 through a conduit or duct. For example, a household cordless drill may be fitted with a feed device that is configured to feed the cable 12 forward upon rotary motion of the drill. Installation may then be done with relatively inexpensive tools.

The protective cap 28 may include a gripping feature for ease of gripping and removing the cap from the ferrule 24. For example, the protective cap 28 may include a flat surface 50 with a raised edge 52 that provides an engagement surface for gripping and pulling the cap off of the ferrule 24. For example, a user's thumb may be placed on the flat surface 50 to engage the edge 52 to pull the protective cap 28 from the ferrule 24.

The protective cap 28 further includes an attachment feature 56. The attachment feature 56 is configured to attach the protective cap 28 to a pull cord (shown in FIG. 4) such that the cable 12 may be pulled through a conduit or other space. The attachment feature 56 is preferably integrally formed with the protective cap 28 such that the attachment feature does not increase the size of the protective cap 28. For example, the attachment feature 56 may be built into the protective cap 28 such that a pull cord can be easily tied to the protective cap 28.

In an exemplary embodiment, the attachment feature 56 includes a cavity 58 formed in the leading tip 49 of the protective cap 28. The cavity 58 is a hollow space in the leading tip 49. The attachment feature 56 further includes at least two distinct openings into the cavity 58. For example, in an embodiment, the protective cap 28 includes an axial opening 60 and a pair of peripheral openings 62, 64. The openings 60, 62, 64 are separate from each other such that each opening 60, 62, 64 acts as a distinct entrance and/or exit into the cavity 58, connecting the cavity 58 to an exterior area outside of the protective cap 28. The attachment feature 56 thus allows a pull cord to enter the cavity 58 through one of the openings, exit the cavity 58 through another one of the openings, become tied and thus secured to the protective cap 28.

The protective cap 28 may include a body 66 having an exterior surface 67. The openings 60, 62, 64 may be formed as holes in the exterior surface 67 and lead to the cavity 58. The body 66 of the protective cap 28 may thus define the openings 60, 62, 64 and the cavity 58 through its shape. The body 66 may be shaped to accommodate attachment of a pull cord more easily. For example, the openings 60, 62, 64 may be elongated (rather than circular) to provide at least one large dimension through which the pull cord may extend. Further, the openings 60, 62, 64 may be aligned with each other. For example, the peripheral openings 62, 64 may mirror each other on opposite sides of the body 66 of the protective cap 28. Moreover, the axial opening 60 may be positioned at a leading point of the tip 49 and be elongated in the same plane as the peripheral openings 62, 64. In this way, a pull cord inserted into the axial opening 60 may already be aligned with both of the peripheral openings 62, 64. The axial opening 60 may be oval or oblong to provide a large entrance for a pull cord while not diminishing the ballistic shape of the tip 49. The peripheral openings 62, 64 may be generally rectangular. Moreover, the elongated shapes renders the cavity 58 as an rectangular slot that does not compromise the rigidity or integrity of the protective cap 28.

Figure 3A:
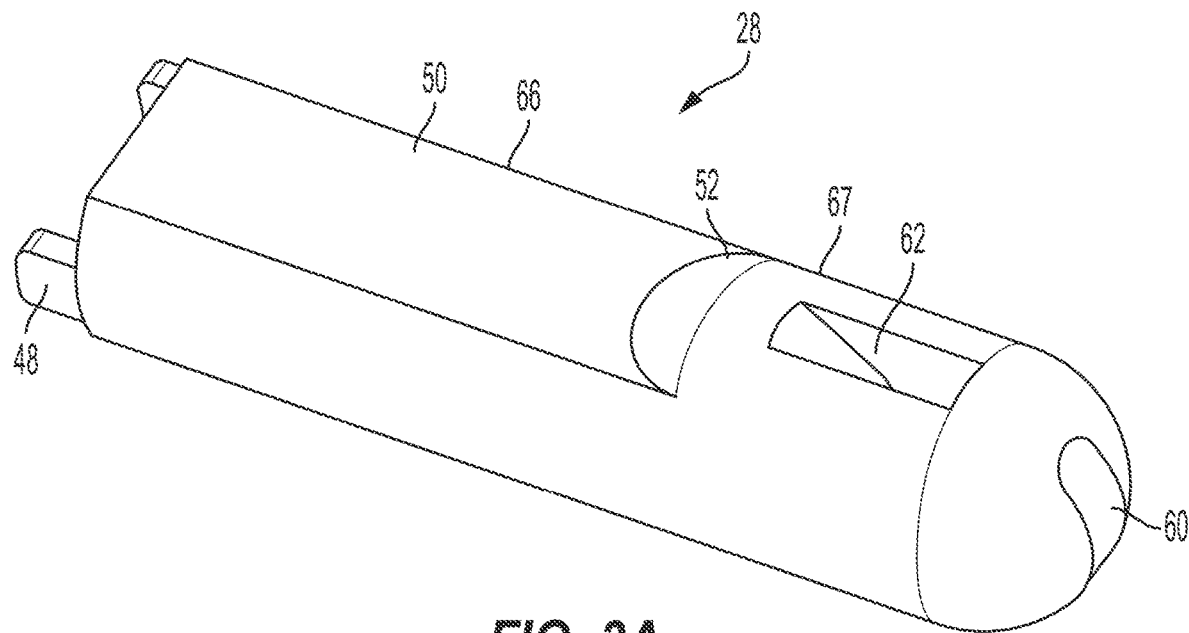
FIG. 3A is a top perspective view of a protective cap for a fiber optic cable, according to an embodiment.
Figure 3B:
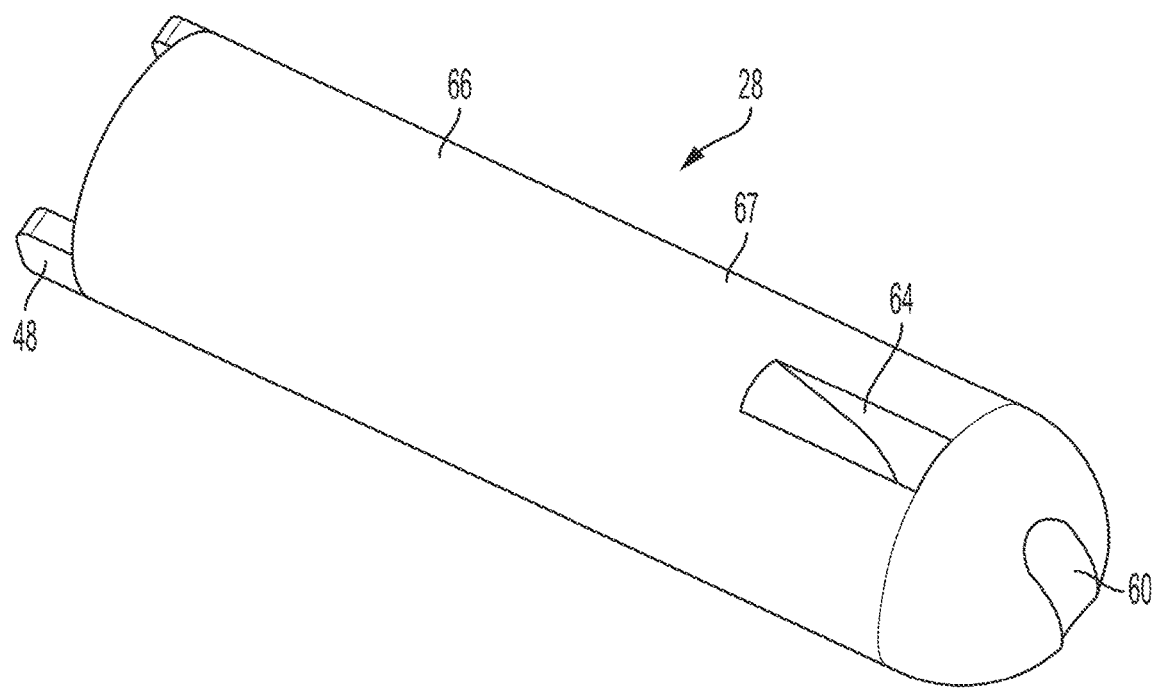
FIG. 3B is a bottom perspective view of the protective cap of FIG. 3A.
Figure 3C:
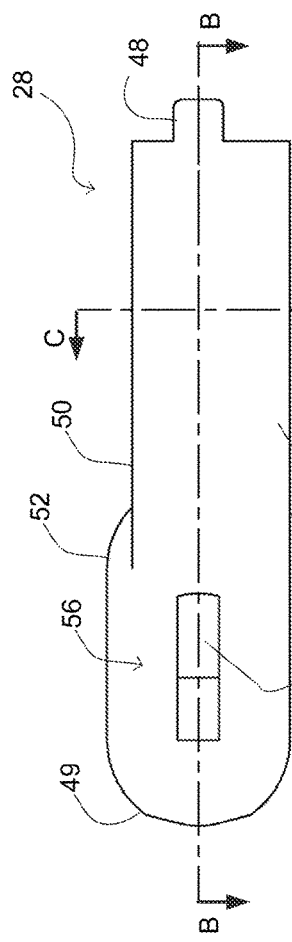
FIG. 3C is a side view of the protective cap of FIG. 3A.
Figure 3D:
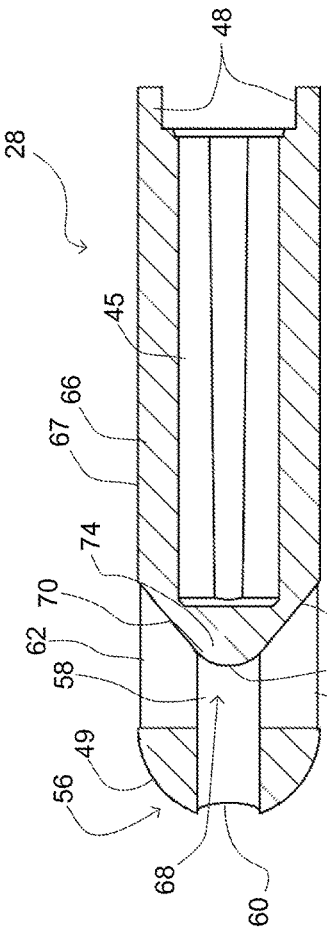
FIG. 3D is a cross-sectional view of the protective cap, taken along line B-B of FIG. 3C.
Figure 3G:
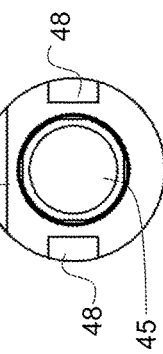
FIG. 3G is a rear view of the protective cap of FIG. 3A.
Figure 3F:
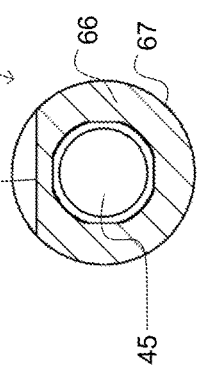
FIG. 3F is cross-sectional view of the protective cap, taken along line C-C of FIG. 3C.
Figure 3E:
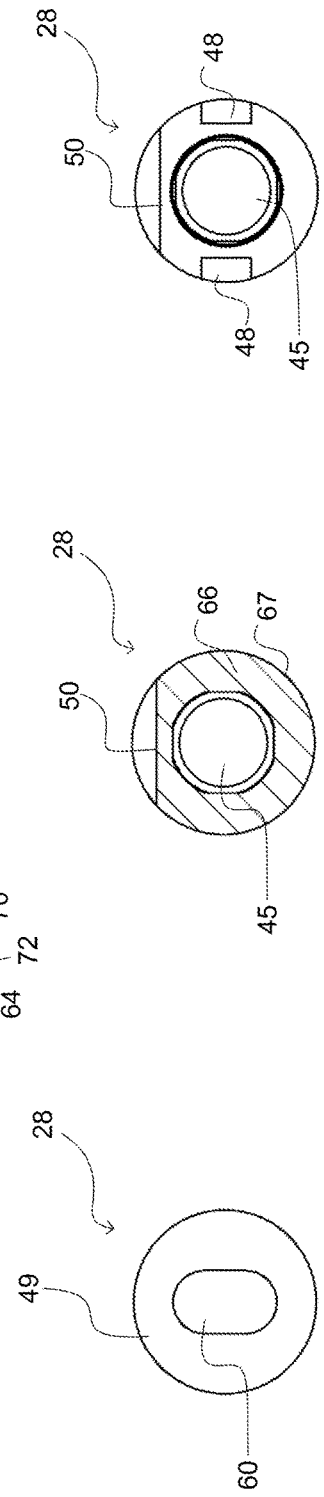
FIG. 3E is a front view of the protective cap of FIG. 3A.

The body 66 may further include a shape inside of the cavity 58 that further eases attachment of a pull cord. For example, the body 66 may include a guide element 68 configured to guide a pull cord that has been inserted into the axial opening 60 out of one of the peripheral openings 62, 64. The guide element 68 may include a pair of angled surfaces 70 that lead from a rounded or pointed tip 72 to a respective one of the peripheral openings 62, 64, as shown in FIG. 3D. The surfaces 70 may are preferably angled with respect to an axis of the protective cap 28, which may be generally cylindrical at a peripheral outside surface. The surfaces 70 may be formed in the same plane and extend at an acute angle with respect to each other. The surfaces 70 may be symmetrical. The surfaces 70 and tip 72 may be formed as a part of a portion 74 of the body 66 that closes off the receptacle 45 such that the ferrule 24 is not exposed to the cavity 58.

Figure 4:
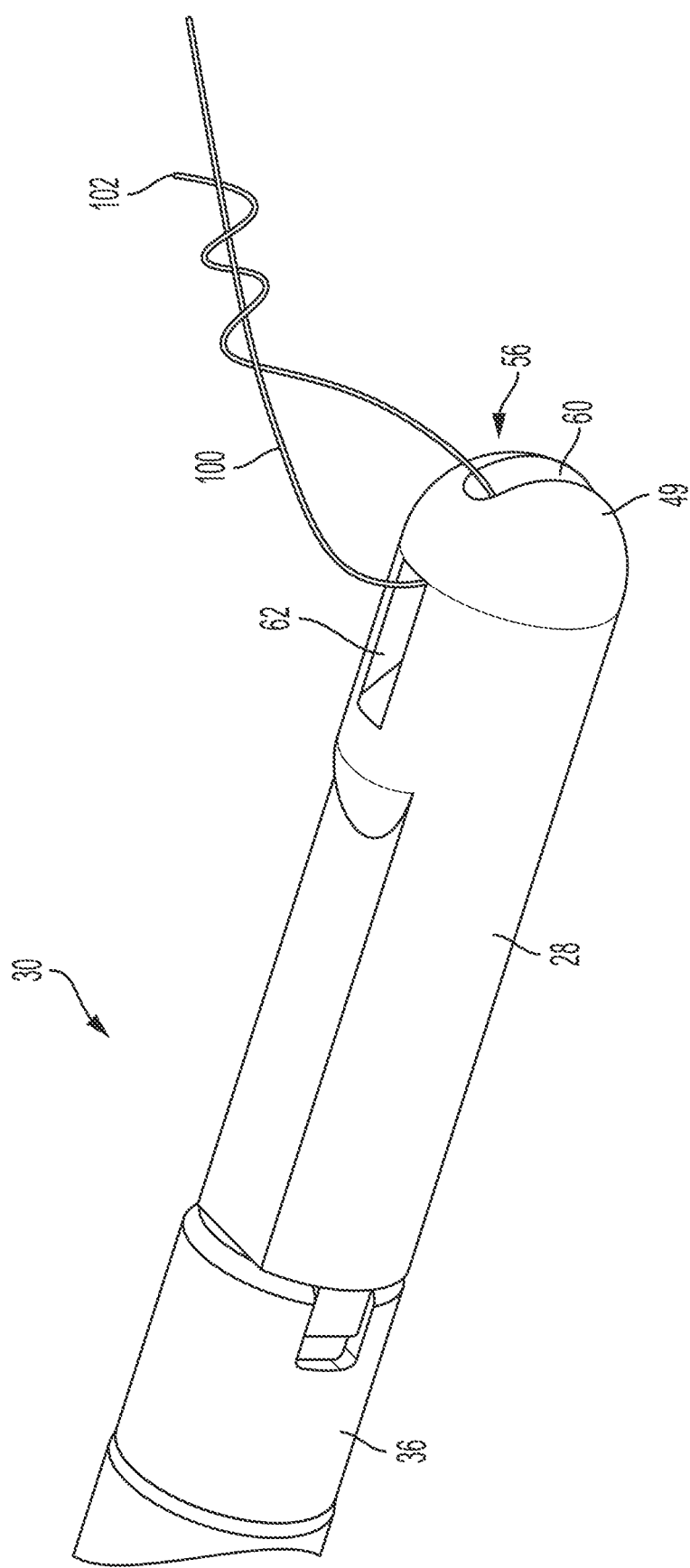
FIG. 4 is a perspective view of the pre-terminated fiber optic cable of FIG. 2A, including the protective cap of FIG. 3A, together with a pull cord, according to an embodiment.

FIG. 4 illustrates the pre-terminated cable end 30, including the protective cap 28, secured to a pull cord 100. The pull cord 100 may be a semi-rigid wire, soft or flexible thread, rope, fabric, or any other length of material capable of traversing into and out of the cavity 58 in the protective cap 28. In an exemplary method, a free end 102 of the pull cord 100 is inserted into the axial opening 60 and is guided out of the peripheral opening 62 by the surface 70. The free end 102 may then be tied, looped, or otherwise connected back to the pull cord 100 in order to create a knot that secures the pull cord 100 to the protective cap 28.

The pre-terminated cable end 30 and connected pull cord 100 enable the cable 12 to be pulled through a conduit. The connection of the pull cord 100 at the leading tip 49 of the protective cap 28 places the attachment point at the leading point of the cable 12 and thereby allows the pull cord 100 to more easily direct the cable 12 through a conduit by ensuring that an axis of the pull cord 100 is generally aligned with an extent of the cable 12 (as opposed to a more tangential connection). The protective cap 28 thus serves multiple useful purposes, including protecting the ferrule 24 and optical fiber 18 in a pre-terminated condition and easing the connection of the pull cord 100 for pulling the cable 12 through a conduit. The configuration of the attachment feature 56 further eases the process through its integrally-formed configuration that does not add any material to the protective cap that may make it more difficult to pull the combined assembly through the conduit.

Some examples of fiber optic cables consistent with disclosed embodiments may have a diameter of about 3 mm for a 1-12 fiber cable, or about 4 mm for a 24 fiber cable. Un-terminated cables of such diameters may readily pass through a duct/conduit that may be, for example, a 10/6 duct (10 mm OD and 6 mm ID). A conduit may be used in situations wherein the cable must be fed over a distance, wherein obstacles may be present that would interfere with placement, or where an extra layer of protection may be needed for the cable. A relatively inexpensive conduit tube may be forced through an area without consideration of damage to the conduit end, in contrast to the use of forcibly feeding a fiber optic cable directly, wherein the end configuration of the cable may be the most expensive section of the cable and would be costly to replace if damaged. A conduit may be used for an entire length of a cable run, or over only portions of the length in areas where such may be needed, to get a cable to a location for a cable connection, that may include, for example, connection to another terminated fiber of same sized ferrule through an adapter, in a junction box, or a receiving device. Once a pre-terminated cable end 30 is at its final destination, the remaining components for providing the connector assembly 10 of FIG. 1A, that is, the ferrule housing 14 and the outer housing 16 may be installed in a manner as indicated in FIG. 1B.

As can be seen in the cross-sectional view of FIG. 2C, a pre-terminated cable end 30 may be configured to have a diameter that is only slightly larger than the diameter of the fiber optic cable 12. In an embodiment, and as examples only, wherein the fiber optic cable may be about 3 mm in diameter, the total diameter of the pre-terminated cable end may be about 4 mm, or, if the diameter of the cable may be about 4 mm, the diameter of the pre-terminated cable end may be about 5 mm. Installation and placement of such a cable may then be done, if needed, through a 6 mm conduit that is only slightly larger than the cable end.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The terms "front," "side," "rear," "top," "bottom," "back," and associated directions (e.g., forward, rearward) are not limiting as to the absolute position of any associated element but help to define relative positions of at least some components, as well as directions of travel. It should be understood that disclosed embodiments are not limited to any particular position or direction based on these terms.

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiment.

The invention claimed is:

1. A terminal end assembly for an optical fiber cable, the assembly comprising:
   a ferrule for receiving and terminating an optical fiber of the optical fiber cable;
   a ferrule holder having a first end for receiving the optical fiber therethrough, and a second end opposite the first end for receiving and retaining the ferrule therein;
   a connector body having a first end configured for receiving and retaining a terminal end of a fiber optic cable therein, and a second end configured for slidably receiving the ferrule holder therein;

a biasing member disposed within the connector body for biasing the ferrule holder axially away from the connector body; and a ferrule retainer for retaining the ferrule holder within the second end of the connector body, the retainer comprising a tubular body for being disposed around the ferrule and ferrule holder; and a protective cap for being disposed around the ferrule and in engagement with the ferrule retainer, the protective cap having a receptacle for receiving the ferrule therein and a leading tip opposite the first end and an attachment feature, wherein the attachment feature comprises a hollow space cavity formed in the leading tip, the cavity comprising an elongated axial distal opening in the leading tip and at least one elongated side opening formed in an exterior side surface of the protective cap, each of the elongated axial distal opening and the at least one elongated side opening connected to the cavity such that a pull cord may enter one of the openings and exit another of the openings to attach to the protective cap.

2. The terminal end assembly of claim 1 wherein the protective cap is configured to spin around the ferrule.

3. The terminal end assembly of claim 1 wherein the ferrule is a cylindrical ceramic ferrule.

4. The terminal end assembly of claim 1 wherein the protective cap is configured to fit around the ferrule such that the protective cap is retained on the ferrule by friction.

* * * * *